United States Patent
Zhang

(10) Patent No.: US 10,638,339 B2
(45) Date of Patent: Apr. 28, 2020

(54) METHOD FOR MEASURING NEIGHBORING CELL RADIO RESOURCE MANAGEMENT AND APPARATUS

(71) Applicant: Huawei Technologies Co., Ltd., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 15/326,606

(22) PCT Filed: Jul. 16, 2014

(86) PCT No.: PCT/CN2014/082328
§ 371 (c)(1),
(2) Date: Jul. 31, 2017

(87) PCT Pub. No.: WO2016/008118
PCT Pub. Date: Jan. 21, 2016

(65) Prior Publication Data
US 2017/0366989 A1 Dec. 21, 2017

(51) Int. Cl.
*H04W 24/08* (2009.01)
*H04W 24/00* (2009.01)
(Continued)

(52) U.S. Cl.
CPC ........... *H04W 24/08* (2013.01); *H04W 24/00* (2013.01); *H04W 24/10* (2013.01); *H04W 74/0833* (2013.01); *H04W 84/045* (2013.01)

(58) Field of Classification Search
CPC ..... H04W 24/00; H04W 24/08; H04W 24/10; H04W 74/0833; H04W 84/045
See application file for complete search history.

(56) References Cited

U.S. PATENT DOCUMENTS

2011/0275394 A1 11/2011 Song et al.
2012/0034925 A1* 2/2012 Noh ...................... H04W 36/30
455/444
(Continued)

FOREIGN PATENT DOCUMENTS

CN 102869039 A 1/2013
CN 102984722 A 3/2013
(Continued)

OTHER PUBLICATIONS

3rd Generation Partnership Project; Technical Specification Group Radio Access Network; Small Cell Enhancements for E-UTRA and E-UTRAN—Physical Layer Aspects (Release 12); 3GPP TR 36.872 V12.1.0 (Dec. 2013), 100 pages.
(Continued)

*Primary Examiner* — Khaled M Kassim
(74) *Attorney, Agent, or Firm* — Slater Matsil, LLP

(57) ABSTRACT

A method includes obtaining, by user equipment from a base station, first information and second information that are sent by the base station and about a micro base station, wherein the first information is used to indicate the micro base station, and the second information is used to indicate a random access resource allocated by the base station to the micro base station. The method also includes accessing, by the user equipment by using the random access resource indicated by the second information, the micro base station indicated by the first information, and obtaining measurement subframe information of a micro cell of the micro base station from the micro base station during a process of accessing the micro base station. The method also includes performing neighboring cell radio resource management measurement of the micro cell on a measurement subframe indicated by the measurement subframe information of the micro cell.

13 Claims, 8 Drawing Sheets

A base station determines a micro base station in a micro cell on which measurement of neighboring cell RRM needs to be performed by UE — 201

The base station allocates a random access resource to the micro base station — 202

The base station sends information about the micro base station and information about the random access resource to the UE — 203

(51) Int. Cl.
*H04W 24/10* (2009.01)
*H04W 74/08* (2009.01)
*H04W 84/04* (2009.01)

(56) References Cited

U.S. PATENT DOCUMENTS

| | | | | |
|---|---|---|---|---|
| 2012/0178482 A1* | 7/2012 | Seo | .................. | H04W 56/00 |
| | | | | 455/501 |
| 2012/0201162 A1* | 8/2012 | Kim | .................. | H04B 17/345 |
| | | | | 370/252 |
| 2012/0202554 A1* | 8/2012 | Seo | .................. | H04W 52/146 |
| | | | | 455/522 |
| 2012/0258724 A1* | 10/2012 | Kim | .................. | H04W 72/082 |
| | | | | 455/452.2 |
| 2013/0089051 A1* | 4/2013 | Bai | .................. | H04W 52/243 |
| | | | | 370/329 |
| 2013/0107798 A1 | 5/2013 | Gao et al. | | |
| 2013/0165130 A1* | 6/2013 | Wu | .................. | H04W 36/08 |
| | | | | 455/444 |
| 2013/0301445 A1* | 11/2013 | Abe | .................. | H04L 5/0007 |
| | | | | 370/252 |
| 2014/0086095 A1* | 3/2014 | Jung | .................. | H04J 11/0023 |
| | | | | 370/252 |
| 2014/0112254 A1 | 4/2014 | Lindoff et al. | | |
| 2014/0219131 A1* | 8/2014 | Yang | .................. | H04W 24/10 |
| | | | | 370/252 |
| 2014/0302862 A1* | 10/2014 | Chen | .................. | H04W 56/0015 |
| | | | | 455/450 |
| 2015/0163687 A1* | 6/2015 | Lee | .................. | H04W 24/10 |
| | | | | 370/252 |
| 2015/0223233 A1* | 8/2015 | Seo | .................. | H04W 36/04 |
| | | | | 370/329 |
| 2015/0365858 A1* | 12/2015 | Zhang | .................. | H04W 36/0083 |
| | | | | 370/331 |
| 2017/0064676 A1* | 3/2017 | Lee | .................. | H04B 7/04 |
| 2017/0188273 A1* | 6/2017 | Yiu | .................. | H04W 36/04 |

FOREIGN PATENT DOCUMENTS

| | | |
|---|---|---|
| CN | 1032200678 A | 7/2013 |
| CN | 103718636 A | 4/2014 |
| WO | 2014015504 A1 | 1/2014 |
| WO | 2014089069 A1 | 6/2014 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 12); 3GPP TS 36.331 V12.2.0 (Jun. 2014), 365 pages.

ZTE, et al., "Enhancements for Densely Deployed Small Cells in LTE," 3GPP TSG RAN Meeting #70, Sitges, Spain, Dec. 7-10, 2015, 8 pages.

* cited by examiner

METHOD FOR MEASURING NEIGHBORING CELL RADIO RESOURCE MANAGEMENT AND APPARATUS

CROSS-REFERENCE TO RELATED APPLICATIONS

This application is a national stage of International Application No. PCT/CN2014/082328, filed Jul. 16, 2014, which is hereby incorporated by reference in its entirety.

TECHNICAL FIELD

The present invention relates to the field of communications technologies, and in particular, to a method for measuring neighboring cell radio resource management (RRM for short) and an apparatus.

BACKGROUND

To meet an increasing capacity requirement in future, a heterogeneous network (HetNet for short) becomes a necessity for future network development. In the heterogeneous network, multiple micro base stations are deployed for a macro base station. By deploying the micro base stations for the macro base station, a system throughput can be improved. However, inter-cell interference is also brought to the heterogeneous network by introducing the micro base station. For example, when user equipment (UE for short) connected to a micro base station is located in a cell range expansion (CRE for short) area of a micro cell, the macro base station interferes with a downlink channel for the UE. Therefore, the macro base station sets some subframes as almost blank subframes (ABS for short). When the UE needs to receive downlink data from the micro base station, the micro base station uses the ABS to send the downlink data to the UE, and the macro base station does not use the ABS.

When the UE connected to the macro base station is moving towards a micro cell, the micro cell approached by the UE may be referred to as a neighboring cell of the UE, and the UE needs to measure neighboring cell RRM. To ensure an accurate result of measuring the neighboring cell RRM by the UE, the macro base station predefines a neighboring cell measurement subset, and the neighboring cell measurement subset is a subset of the ABS. When the UE needs to measure the neighboring cell RRM, the macro base station selects some subframes from the ABS to form a neighboring cell measurement subset, and sends the neighboring cell measurement subset to the UE. The UE measures the neighboring cell RRM on a subframe included in the neighboring cell measurement subset.

Although interference caused by the macro base station to measuring the neighboring cell RRM by the UE can be reduced in the existing method for measuring the neighboring cell RRM, when micro base stations are densely distributed, the micro base station also influences a result of measuring the neighboring cell RRM by the UE.

SUMMARY

Embodiments of the present invention provide a method for measuring neighboring cell RRM and an apparatus, which can reduce impact of inter-micro-cell interference on measuring the neighboring cell RRM by UE in a case of densely distributed micro cells.

To resolve the foregoing technical problem, the embodiments of the present invention disclose the following technical solutions.

According to a first aspect, a method for measuring neighboring cell radio resource management is provided. The method includes obtaining, by user equipment from a base station, first information and second information that are sent by the base station and about a micro base station, where the first information is used to indicate the micro base station, and the second information is used to indicate a random access resource allocated by the base station to the micro base station. The method also includes accessing, by the user equipment by using the random access resource indicated by the second information, the micro base station indicated by the first information, and obtaining measurement subframe information of a micro cell of the micro base station from the micro base station during a process of accessing the micro base station, where the measurement subframe information of the micro cell is different from measurement subframe information of another micro cell that is adjacent to the micro cell and whose interference exceeds a preset interference threshold. The method also includes measuring, by the user equipment, neighboring cell radio resource management of the micro cell on a measurement subframe indicated by the measurement subframe information of the micro cell.

With reference to the first aspect, in a first possible implementation manner of the first aspect, the obtaining, by the user equipment, measurement subframe information of a micro cell of the micro base station from the micro base station during a process of accessing the micro base station includes: sending, by the user equipment, a random access request message to the micro base station during the process of accessing the micro base station, and adding a preset preamble or measurement subframe obtaining indication information to the random access request message, where the preset preamble or the measurement subframe obtaining indication information is used to indicate obtaining the measurement subframe information of the micro cell of the micro base station; and receiving, by the user equipment during the process of accessing the micro base station, a random access response message sent by the micro base station, and obtaining the measurement subframe information of the micro cell of the micro base station from the random access response message.

With reference to the first possible implementation manner of the first aspect, in a second possible implementation manner of the first aspect, before the accessing, by the user equipment by using the random access resource indicated by the second information, the micro base station indicated by the first information, the method further includes: receiving, by the user equipment, information that is about initial random access transmit power and sent by the base station; and correspondingly, sending, by the user equipment when using the random access resource indicated by the first information to access the micro base station indicated by the second information, the random access request message by using the initial random access transmit power indicated by the information about the initial random access transmit power.

With reference to the first possible implementation manner of the first aspect, and/or the second possible implementation manner of the first aspect, in a third possible implementation manner of the first aspect, the preset preamble is stored in advance in the user equipment or is indicated to the user equipment by the base station by using display signaling.

With reference to the first aspect, and/or the first possible implementation manner of the first aspect, and/or the second possible implementation manner of the first aspect, and/or the third possible implementation manner of the first aspect, in a fourth possible implementation manner of the first aspect, the random access resource allocated by the base station to the micro base station is predetermined by the base station by means of operation, administration, and maintenance; or the random access resource allocated by the base station to the micro base station is determined after the base station negotiates with the micro base station in advance.

According to a second aspect, a method for measuring neighboring cell radio resource management is provided. The method includes determining, by a base station, a micro base station in a micro cell on which measurement of neighboring cell radio resource management needs to be performed by user equipment. The method also includes allocating, by the base station, a random access resource to the micro base station. The method also includes sending, by the base station, information about the micro base station and information about the random access resource to the user equipment, so that the user equipment accesses the micro base station by using the random access resource, obtains measurement subframe information of the micro cell from the micro base station during an access process, and measures the neighboring cell radio resource management of the micro cell on a measurement subframe indicated by the measurement subframe information of the micro cell, where the measurement subframe information of the micro cell is different from measurement subframe information of another micro cell that is adjacent to the micro cell and whose interference exceeds a preset interference threshold.

With reference to the second aspect, in a first possible implementation manner of the second aspect, before the sending, by the base station, information about the micro cell and information about the random access resource to the user equipment, the method further includes: determining, by the base station, initial random access transmit power at which the user equipment performs the access; and correspondingly, further sending, by the base station when sending the information about the micro cell and the information about the random access resource to the user equipment, information about the initial random access transmit power to the user equipment.

With reference to the first possible implementation manner of the second aspect, in a second possible implementation manner of the second aspect, the determining, by the base station, initial random access transmit power at which the user equipment performs the access includes: performing, by the base station, path loss estimation according to reference signal received power or reference signal received quality that is of the micro cell and is reported by the user equipment, and determining the initial random access transmit power according to an estimated value of the path loss estimation.

With reference to the second possible implementation manner of the second aspect, in a third possible implementation manner of the second aspect, the determining the initial random access transmit power according to an estimated value of the path loss estimation includes: determining the estimated value as the initial random access transmit power; or determining a value obtained by adding a preset offset to the estimated value as the initial random access transmit power.

With reference to the first possible implementation manner of the second aspect, and/or the second possible implementation manner of the second aspect, and/or the third possible implementation manner of the second aspect, in a fourth possible implementation manner of the second aspect, the information about the initial random access transmit power is carried in a transmit power control command.

With reference to the second aspect, and/or the first possible implementation manner of the second aspect, and/or the second possible implementation manner of the second aspect, and/or the third possible implementation manner of the second aspect, and/or the fourth possible implementation manner of the second aspect, in a fifth possible implementation manner of the second aspect, the base station adds the information about the micro base station and the information about the random access resource to a system information block 2 message or radio resource control signaling and sends the system information block 2 message or the radio resource control signaling to the user equipment.

According to a third aspect, a method for measuring neighboring cell radio resource management is provided. The method includes performing, by a micro base station, access processing with user equipment by using a random access resource allocated by a base station to the user equipment, and sending measurement subframe information of a micro cell of the micro base station to the user equipment during an access process, so that the user equipment measures neighboring cell radio resource management of the micro cell on a measurement subframe indicated by the measurement subframe information of the micro cell, where the measurement subframe information of the micro cell is different from measurement subframe information of another micro cell that is adjacent to the micro cell and whose interference exceeds a preset interference threshold.

With reference to the third aspect, in a first possible implementation manner of the third aspect, the sending, by the micro base station, measurement subframe information of a micro cell of the micro base station to the user equipment during an access process includes: sending, by the micro base station, a random access response message to the user equipment during the access process according to a preset preamble or measurement subframe obtaining indication information carried in a random access request message sent by the user equipment, where the random access response message carries the measurement subframe information of the micro cell of the micro base station.

According to a fourth aspect, a method for measuring neighboring cell radio resource management is provided. The method includes determining, by a base station, N micro cells on which measurement of neighboring cell radio resource management needs to be performed by user equipment, where N is a natural number. The method also includes determining, by the base station, at least one measurement subframe for each micro cell in the N micro cells, where an $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N. The method also includes sending, by the base station to the user equipment, information about the at least one measurement subframe determined by the base station for each micro cell of the N micro cells, so that the user equipment measures neighboring cell radio resource management.

With reference to the fourth aspect, in a first possible implementation manner of the fourth aspect, the information about the at least one measurement subframe determined by the base station for the N micro cells is carried in radio resource control signaling.

According to a fifth aspect, user equipment is provided. The user equipment includes an obtaining unit, configured to obtain, from a base station, first information and second information that are sent by the base station and about a micro base station, where the first information is used to indicate the micro base station, and the second information is used to indicate a random access resource allocated by the base station to the micro base station. The user equipment also includes an access unit, configured to access, by using the random access resource indicated by the second information, the micro base station indicated by the first information, and obtain measurement subframe information of a micro cell of the micro base station from the micro base station during a process of accessing the micro base station, where the measurement subframe information of the micro cell is different from measurement subframe information of another micro cell that is adjacent to the micro cell and whose interference exceeds a preset interference threshold. The user equipment also includes a measurement unit, configured to measure neighboring cell radio resource management of the micro cell on a measurement subframe indicated by the measurement subframe information.

With reference to the fifth aspect, in a first possible implementation manner of the fifth aspect, the access unit includes a transceiver unit, where the transceiver unit is configured to send a random access request message to the micro base station during the process in which the user equipment accesses the micro base station, and add a preset preamble or measurement subframe obtaining indication information to the random access request message, where the preset preamble or the measurement subframe obtaining indication information is used to indicate obtaining the measurement subframe information of the micro cell of the micro base station; and the transceiver unit is further configured to receive, during the process in which the user equipment accesses the micro base station, a random access response message sent by the micro base station, and obtain the measurement subframe information of the micro cell of the micro base station from the random access response message.

With reference to the first possible implementation manner of the fifth aspect, in a second possible implementation manner of the fifth aspect, the obtaining unit is further configured to receive information that is about initial random access transmit power and sent by the base station; and correspondingly, the transceiver unit is specifically configured to send the random access request message by using the initial random access transmit power indicated by the information about the initial random access transmit power.

According to a sixth aspect, a base station is provided. The base station also includes a determining unit, configured to determine a micro base station in a micro cell on which measurement of neighboring cell radio resource management needs to be performed by user equipment. The base station also includes an allocation unit, configured to allocate a random access resource to the micro base station determined by the determining unit. The base station also includes a sending unit, configured to send information about the micro base station and information about the random access resource to the user equipment, so that the user equipment accesses the micro base station by using the random access resource, obtains measurement subframe information of the micro cell from the micro base station during an access process, and measures the neighboring cell radio resource management of the micro cell on a measurement subframe indicated by the measurement subframe information of the micro cell, where the measurement subframe information of the micro cell is different from measurement subframe information of another micro cell that is adjacent to the micro cell and whose interference exceeds a preset interference threshold.

With reference to the sixth aspect, in a first possible implementation manner of the sixth aspect, the determining unit is further configured to: determine initial random access transmit power at which the user equipment performs the access; and correspondingly, the sending unit is further configured to send information about the initial random access transmit power to the user equipment when sending the information about the micro cell and the information about the random access resource to the user equipment.

With reference to the first possible implementation manner of the sixth aspect, in a second possible implementation manner of the sixth aspect, the determining unit is specifically configured to perform path loss estimation according to reference signal received power or reference signal received quality that is of the micro cell and is reported by the user equipment, and determine the initial random access transmit power according to an estimated value of the path loss estimation.

With reference to the first possible implementation manner of the sixth aspect, and/or the second possible implementation manner of the sixth aspect, in a third possible implementation manner of the sixth aspect, the information about the initial random access transmit power is carried in a transmit power control command.

According to a seventh aspect, a base station is provided. The base station includes an access unit, configured to perform access processing with user equipment by using a random access resource allocated by a base station to the user equipment. The base station also includes a sending unit, configured to send measurement subframe information of a micro cell of the micro base station to the user equipment during an access process of the access unit, so that the user equipment performs measurement of neighboring cell radio resource management on the micro cell on a measurement subframe of the micro cell, where the measurement subframe information of the micro cell is different from measurement subframe information of another micro cell that is adjacent to the micro cell and whose interference exceeds a preset interference threshold.

With reference to the seventh aspect, in a first possible implementation manner of the seventh aspect, the sending unit is specifically configured to send a random access response message to the user equipment according to a preset preamble or measurement subframe obtaining indication information carried in a random access request message sent by the user equipment, where the random access response message carries the measurement subframe information of the micro cell of the micro base station.

According to an eighth aspect, a base station is provided. The base station includes a first determining unit, configured to determine N micro cells on which measurement of neighboring cell radio resource management needs to be performed by user equipment, where N is a natural number. The base station also includes a second determining unit, configured to determine at least one measurement subframe for each micro cell in the N micro cells, where an $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N; and a sending unit, configured to send, to the user equipment, information about the at least one measurement subframe determined by the second determining unit for each micro cell of the N micro cells, so that the user equipment measures neighboring cell radio resource management.

With reference to the eighth aspect, in a first possible implementation manner of the eighth aspect, the information about the at least one measurement subframe determined by the second determining unit for the N micro cells is carried in radio resource control signaling.

According to the method for measuring neighboring cell radio resource management and the apparatus that are provided in the embodiments of the present invention, impact of inter-micro-cell interference on measuring neighboring cell radio resource management by the user equipment is reduced.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, a person of ordinary skill in the art may still derive other drawings from these accompanying drawings without creative efforts.

DETAILED DESCRIPTION OF ILLUSTRATIVE EMBODIMENTS

Embodiments of the present invention provide a method for measuring neighboring cell RRM and an apparatus, which can reduce impact of inter-micro-cell interference on measuring the neighboring cell RRM by UE in a case of densely distributed micro cells.

To make a person skilled in the art better understand the technical solutions in the embodiments of the present invention, and make the foregoing objectives, features, and advantages of the embodiments of the present invention clearer and easier to understand, the following further describes the technical solutions in the embodiments of the present invention in detail with reference to the accompanying drawings.

The following embodiments shown in FIG. 1 to FIG. 4 are mainly applied to the following scenario: Measurement subframe information corresponding to each micro cell is preconfigured in a micro base station in each micro cell, and neighboring micro cells that have serious interference correspond to different measurement subframe information. For a measurement subframe of any micro cell (for example, a first micro cell), a micro base station in a micro cell that is adjacent to the first micro cell and seriously interferes with the first micro cell configures a corresponding measurement subframe as an ABS. UE accesses a base station that provides a service for the UE, and the base station cannot obtain the measurement subframe information of each micro cell from each micro base station. The UE may be macro UE, the macro UE is UE that accesses a macro base station, and the base station may be a macro base station; or the UE may be micro UE, the micro UE refers to UE that accesses a micro base station, and the base station may be a micro base station.

For two neighboring micro cells, whether serious interference exists between the two neighboring micro cells may be determined according to reference signal received power (RSRP for short) or reference signal received quality (RSRQ for short) that is of UE located in a shared coverage area of the two neighboring micro cells and is about the two micro cells, and a specific determining method is not described in the embodiments of the present invention.

Figure 1:
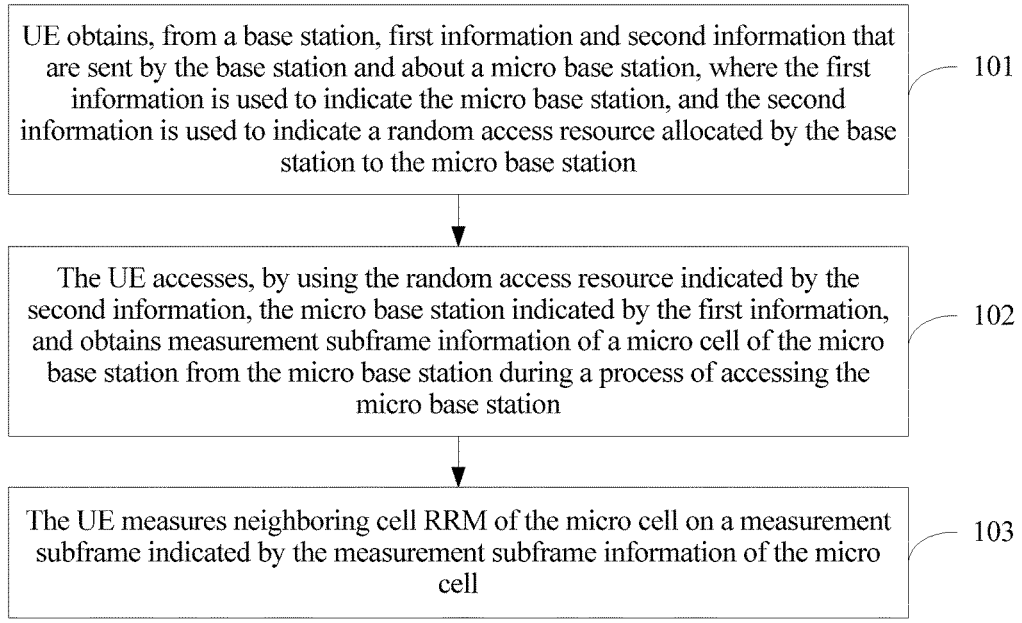
FIG. 1 is a flowchart of an embodiment of a method for measuring neighboring cell RRM according to the present invention.

Referring to FIG. 1, FIG. 1 is a flowchart of an embodiment of a method for measuring neighboring cell RRM according to the present invention. This embodiment is described from a perspective of UE. The method includes the following steps.

Step 101: UE obtains, from a base station, first information and second information that are sent by the base station and about a micro base station, where the first information is used to indicate the micro base station, and the second information is used to indicate a random access resource allocated by the base station to the micro base station.

In this embodiment, the base station may determine a micro cell on which measurement of neighboring cell RRM needs to be performed by the UE, then determine a micro base station of the micro cell on which measurement of neighboring cell RRM needs to be performed, and allocate a random access resource to the determined micro base station. For a specific process, refer to a description in step 201. Details are not described herein.

Step 102: The UE accesses, by using the random access resource indicated by the second information, the micro base station indicated by the first information, and obtains measurement subframe information of a micro cell of the micro base station from the micro base station during a process of accessing the micro base station.

The measurement subframe information of the micro cell is different from measurement subframe information of another micro cell that is adjacent to the micro cell and causes serious interference.

The UE may use the ransom access resource to access the micro base station in the micro cell, and add the measurement subframe information of the micro cell in this embodiment to a message (for example, a random access response message) transmitted during the access process. For specific implementation, refer to an embodiment shown in FIG. 4.

When accessing the micro base station in the micro cell by using the random access resource, the UE may successfully access the micro base station or may fail to access the micro base station.

Step 103: The UE measures neighboring cell RRM of the micro cell on a measurement subframe indicated by the measurement subframe information of the micro cell.

Details about how the UE specifically measures the neighboring cell RRM of the micro cell on the measurement subframe of the micro cell are not described in the present invention.

In this embodiment, UE accesses a micro base station by using a random access resource, obtains measurement subframe information of a micro cell of the micro base station from the micro base station during an access process, and measures neighboring cell RRM of the micro cell on a measurement subframe indicated by the measurement subframe information. Because the measurement subframe of the micro cell is different from a measurement subframe of another micro cell that is adjacent to the micro cell and causes serious interference, when the UE measures the neighboring cell RRM of the micro cell, relatively less interference is caused by the another micro cell to measuring the neighboring cell RRM of the micro cell by the UE, thereby reducing impact of inter-micro-cell interference on measuring the neighboring cell RRM by the UE.

Figure 2:
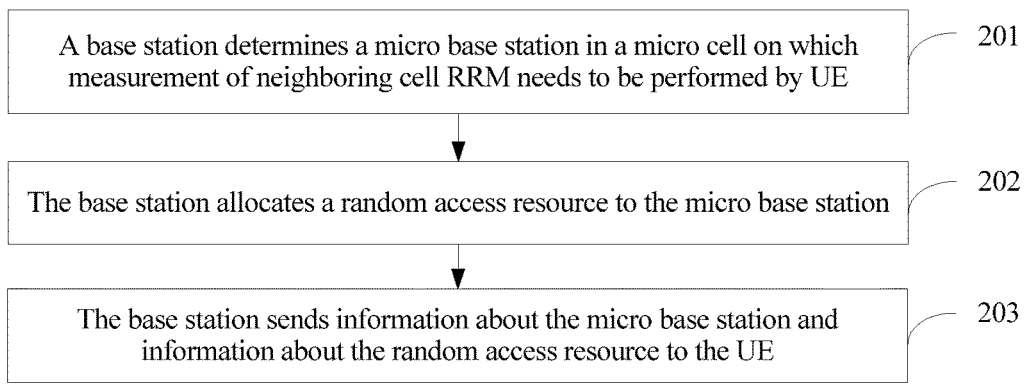
FIG. 2 is a flowchart of another embodiment of a method for measuring neighboring cell RRM according to the present invention.

Referring to FIG. 2, FIG. 2 is a flowchart of another embodiment of a method for measuring neighboring cell RRM according to the present invention. This embodiment is described from a perspective of a base station. The method includes the following steps.

Step 201: A base station determines a micro base station in a micro cell on which measurement of neighboring cell RRM needs to be performed by UE.

The base station may determine, according to RSRP or RSRQ that is of the UE about each micro cell and is reported by the UE, whether measurement of neighboring cell RRM needs to be performed and micro cells on which measurement of neighboring cell RRM is to be performed.

Specifically, the base station may preset a threshold for the RSRP or the RSRQ. When RSRP or RSRQ that is of the UE about a micro cell and is reported by the UE exceeds the threshold, it is determined that the UE needs to perform measurement of neighboring cell RRM on the micro cell. A specific value of the threshold may be independently set in a practical application, which is not limited in the present invention.

Step 202: The base station allocates a random access resource to the micro base station.

The random access resource allocated by the base station to the micro cell may be predetermined by the base station by means of operation, administration and maintenance (OAM for short), or may be determined after the base station negotiates with the micro base station in advance.

Step 203: The base station sends information about the micro base station and information about the random access resource to the UE, so that the UE accesses the micro base station by using the random access resource, obtains measurement subframe information of the micro cell from the micro base station during an access process, and measures neighboring cell RRM of the micro cell on a measurement subframe indicated by the measurement subframe information of the micro cell, where the measurement subframe information of the micro cell is different from measurement subframe information of another micro cell that is adjacent to the micro cell and whose interference exceeds a preset interference threshold.

When the base station sends the information about the micro base station and the information about the random access resource allocated by the base station to the micro base station to the UE, the information about the micro base station and the information about the random access resource allocated by the base station to the micro base station may be carried in a system message, for example, a system information block (SIB for short) 2 broadcast message, or the information about the micro base station and the information about the random access resource allocated by the base station to the micro base station may be carried in radio resource control (RRC for short) signaling, which is not limited in the present invention.

In this embodiment, a base station determines a micro base station in a micro cell on which measurement of neighboring cell RRM needs to be performed by UE, allocates a random access resource to the micro base station, and sends information about the micro base station and information about the random access resource allocated by the base station to the micro base station to the UE, so as to assist the UE in implementing measurement of the neighboring cell RRM of the micro cell.

Figure 3:
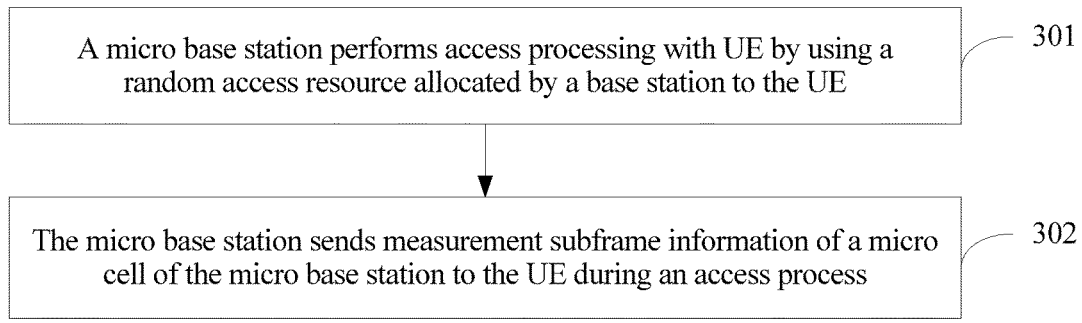
FIG. 3 is a flowchart of another embodiment of a method for measuring neighboring cell RRM according to the present invention.

Referring to FIG. 3, FIG. 3 is a flowchart of another embodiment of a method for measuring neighboring cell RRM according to the present invention. This embodiment is described from a perspective of a micro base station in a micro cell on which measurement of neighboring cell RRM needs to be performed by UE. The method includes the following steps.

Step 301: A micro base station performs access processing with UE by using a random access resource allocated by a base station to the UE.

When accessing the micro base station by using the random access resource, the UE may successfully access the micro base station or may fail to access the micro base station.

Step 302: The micro base station sends measurement subframe information of a micro cell of the micro base station to the UE during an access process, so that the UE measures neighboring cell RRM of the micro cell on a measurement subframe of the micro cell, where the measurement subframe information of the micro cell is different from measurement subframe information of another micro cell that is adjacent to the micro cell and whose interference exceeds a preset interference threshold.

The UE may use the ransom access resource to access the micro base station in the micro cell, and add the measurement subframe information of the micro cell in this embodiment to a message (for example, a random access response message) transmitted during the access process. For specific implementation, refer to an embodiment shown in FIG. 4.

In this embodiment, a micro base station performs access processing with UE, and sends measurement subframe information of a micro cell of the micro base station to the UE during an access process, so that the UE measures neighboring cell RRM of the micro cell on a measurement subframe of the micro cell, and the micro base station implements measurement of the neighboring cell RRM of the micro cell in collaboration with the UE.

Figure 4:
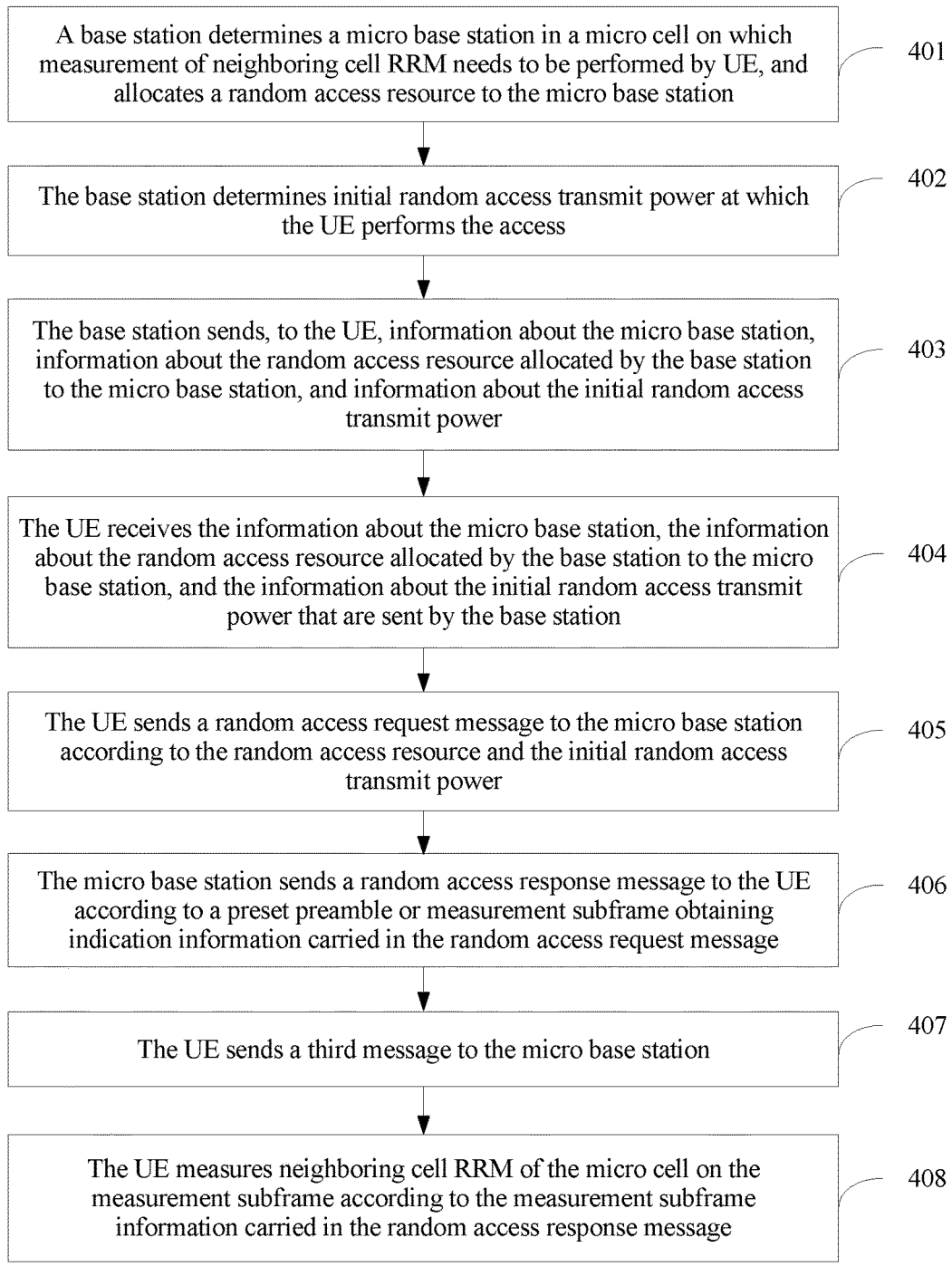
FIG. 4 is a flowchart of another embodiment of a method for measuring neighboring cell RRM according to the present invention.

Referring to FIG. 4, FIG. 4 is a flowchart of another embodiment of a method for measuring neighboring cell RRM according to the present invention. This embodiment describes a process of measuring neighboring cell RRM of a micro cell of a micro base station by means of interaction between a base station, UE, and the micro base station. That the UE accesses the micro base station is used as an example in this embodiment. The method includes the following steps.

Step 401: A base station determines a micro base station in a micro cell on which measurement of neighboring cell RRM needs to be performed by UE, and allocates a random access resource to the micro base station.

For implementation of this step, refer to descriptions in step 201 and step 202. Details are not described herein again.

Step 402: The base station determines initial random access transmit power at which the UE performs a random access.

In this step, the base station may perform path loss estimation according to RSRP or RSRQ reported by the UE, and determine the initial random access transmit power according to an estimated value of the path loss estimation. A specific determining method is not limited herein. For example, the estimated value may be determined as the initial random access transmit power, or a value obtained by adding a preset offset to the estimated value may be determined as the initial random access transmit power.

Step 402 is an optional step.

Step 403: The base station sends, to the UE, information about the micro base station, information about the random access resource allocated by the base station to the micro base station, and information about the initial random access transmit power.

In step 403, the information in step 403 may be carried in a system message (for example, a SIB2 broadcast message) by the base station, or the information in step 403 may be carried in RRC signaling, or the like, which is not limited in the present invention.

In addition, the initial random access transmit power may also be sent by using a transmit power control (TPC for short) command. The TPC command may be carried in a physical downlink control channel (PDCCH for short) format 1A.

Step 404: The UE receives the information about the micro base station, the information about the random access resource allocated by the base station to the micro base station, and the information about the initial random access transmit power that are sent by the base station.

Step 405: The UE sends a random access request message to the micro base station according to the random access resource and the initial random access transmit power.

In this embodiment, the UE may add a preset preamble or measurement subframe obtaining indication information to the random access request message. The preset preamble or the measurement subframe obtaining indication information is used to indicate to the micro base station that a purpose of the random access of the UE is to obtain RRM measurement subframe information.

The random access request message may be a random access sequence, and the preset preamble is carried in the random access sequence.

Alternatively, the random access request message may be implemented in a message form, and in this case, the measurement subframe obtaining indication information may be carried in the random access request message.

The present invention sets no limitation on a specific preamble serving as the preset preamble.

The preset preamble may be stored in advance in the UE, or the preset preamble may be determined after the base station negotiates with the micro base station in advance. Before step 405 is executed, the base station sends the preset preamble to the UE (for example, the preset preamble is indicated to the UE by using display signaling by the base station). In a possible implementation manner, the preset preamble may be sent to the UE together with the information about the micro base station, the information about the random access resource allocated by the base station to the micro base station, and the information about the initial random access transmit power in step 403.

How the measurement subframe obtaining indication information is specifically implemented is not limited herein, provided that the measurement subframe obtaining indication information can indicate to the micro base station that the purpose of the random access is to obtain the measurement subframe information of the micro cell.

Step 406: The micro base station sends a random access response message to the UE according to a preset preamble or measurement subframe obtaining indication information carried in the random access request message.

The measurement subframe information of the micro cell of the micro base station may be carried in the random access response message.

Step 407: The UE sends a third message to the micro base station, for example, an RRC connection request message, a control message, a service data packet, or the like.

The foregoing step 405 to step 407 is a process of accessing the micro base station by the UE.

Because the purpose of accessing the micro base station by the UE is not whether to be capable of successfully accessing the micro base station but to obtain the measurement subframe information of the micro cell, step 407 may be omitted in a practical application. That is, without executing step 407 between the UE and the micro base station, the purpose of obtaining the measurement subframe information of the micro cell by the UE by using the random access resource in the present invention can still be realized, and in comparison with executing step 407 between the UE and the micro base station, transmission resources between the UE and the micro base station are saved.

Step 408: The UE measures neighboring cell RRM of the micro cell on the measurement subframe according to the measurement subframe information in the random access response message.

In this embodiment, UE uses the random access resource to access the micro base station, obtains measurement subframe information of the micro cell from the micro base station during an access process, and measures neighboring cell RRM of the micro cell on a measurement subframe of the micro cell. Because the measurement subframe of the micro cell is different from a measurement subframe of another micro cell that is adjacent to the micro cell and causes serious interference, when the UE measures the neighboring cell RRM of the micro cell, relatively less interference is caused by the another micro cell to measuring the neighboring cell RRM of the micro cell by the UE, thereby reducing impact of inter-micro-cell interference on measuring the neighboring cell RRM by the UE.

Figure 5:
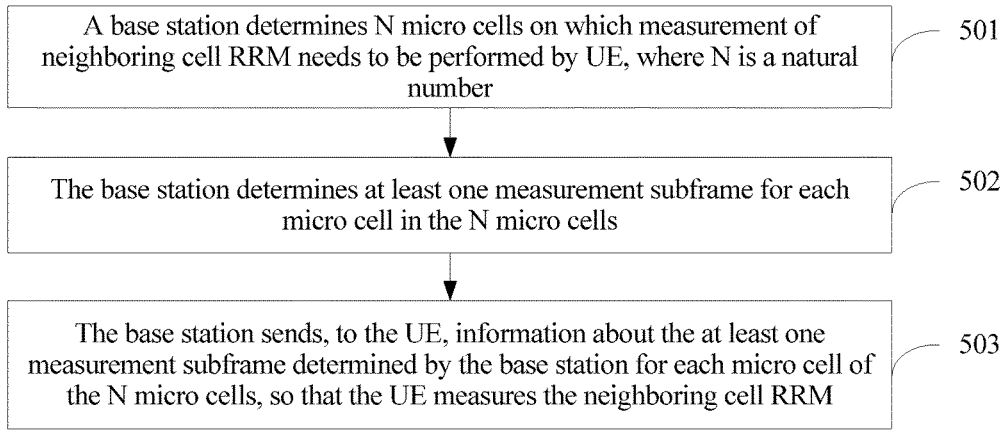
FIG. 5 is a flowchart of another embodiment of a method for measuring neighboring cell RRM according to the present invention.
Figure 6:
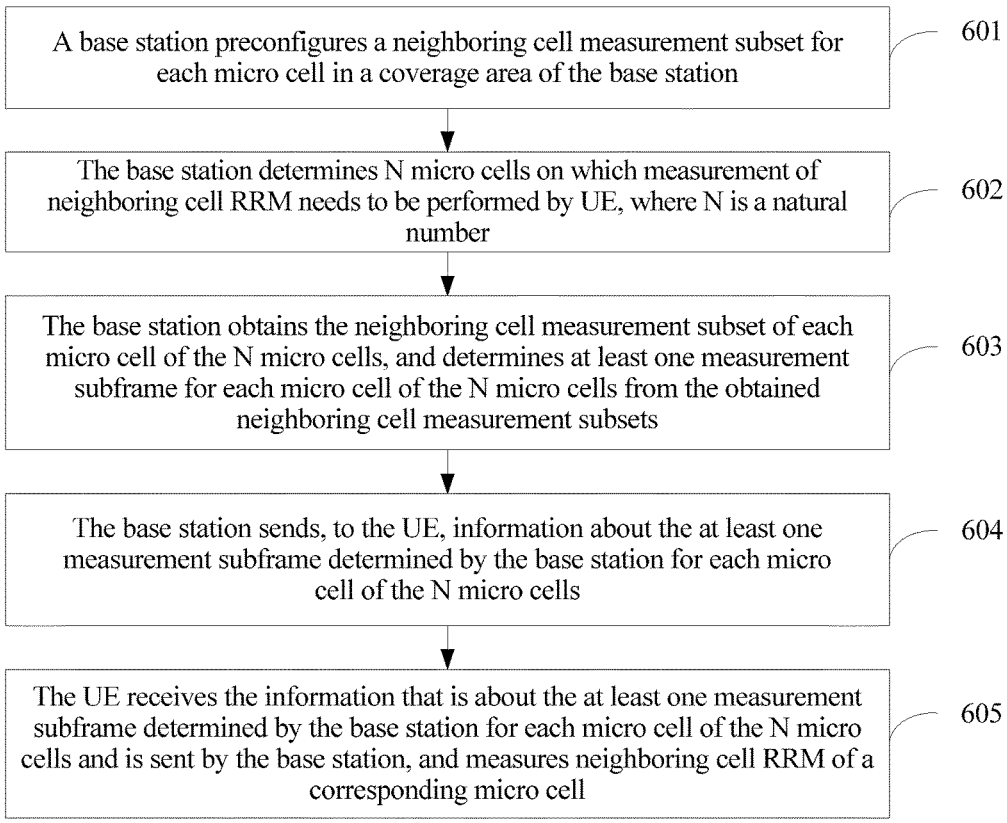
FIG. 6 is a flowchart of another embodiment of a method for measuring neighboring cell RRM according to the present invention.

The following embodiments shown in FIG. 5 and FIG. 6 are mainly applied to the following scenario: UE accesses a base station that provides a service for the UE, corresponding measurement subframe information is preconfigured in the base station for each micro cell, and the base station controls all measurement subframes of the micro cells.

Referring to FIG. 5, FIG. 5 is a flowchart of another embodiment of a method for measuring neighboring cell RRM according to the present invention. This embodiment is described from a perspective of a base station. The method includes the following steps.

Step 501: A base station determines N micro cells on which measurement of neighboring cell RRM needs to be performed by UE, where N is a natural number.

For implementation of this step, refer to a related description in step 201. Details are not described herein again.

Step 502: The base station determines at least one measurement subframe for each micro cell in the N micro cells, where an $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N.

Specifically, different measurement subframes are determined by the base station for any two neighboring micro cells that are in the N micro cells and whose interference exceeds the preset interference threshold.

For a measurement subframe of each micro cell of the N micro cells, a micro base station in a micro cell that is adjacent to the micro cell and whose interference to the micro cell exceeds the preset interference threshold may configure a corresponding measurement subframe as an ABS.

Figure 7:
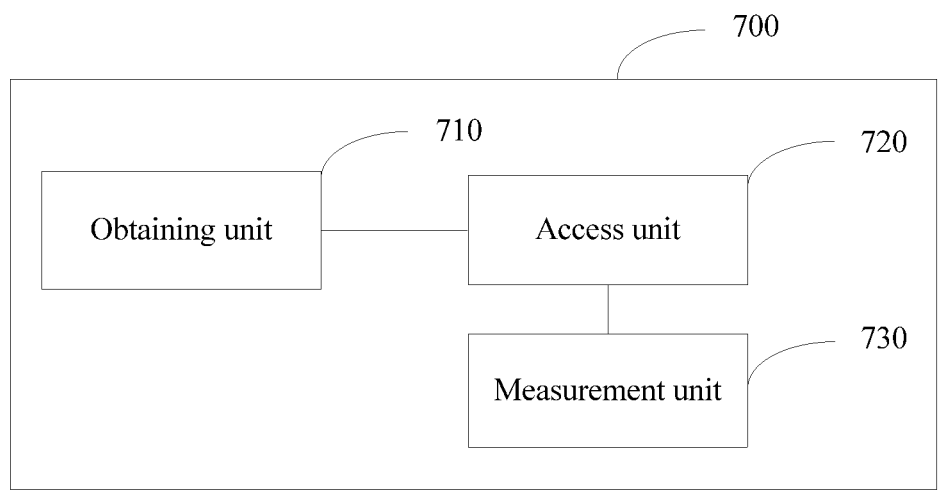
FIG. 7 is a structural diagram of an embodiment of user equipment according to the present invention.

Specific implementation of this step is exemplified in FIG. 7, and details are not described herein.

Step 503: The base station sends, to the UE, information about the at least one measurement subframe determined by the base station for each micro cell of the N micro cells, so that the UE measures neighboring cell RRM.

The information about the at least one measurement subframe determined by the base station for the N micro cells may be carried in specific RRC signaling and sent to the UE.

In the method for measuring neighboring cell RRM provided in this embodiment, impact of inter-micro-cell interference on measuring the neighboring cell RRM by UE can be reduced.

Referring to FIG. 6, FIG. 6 is a flowchart of another embodiment of a method for measuring neighboring cell RRM according to the present invention. This embodiment describes a process of measuring neighboring cell RRM of a micro cell of a micro base station by means of interaction between a base station, UE, and the micro base station. The method includes the following steps.

Step 601: The base station preconfigures a neighboring cell measurement subset for each micro cell in a coverage area of the base station, the neighboring cell measurement subset includes at least one measurement subframe of a corresponding micro cell, and at least one different measurement subframe exists between neighboring cell measurement subsets of two neighboring micro cells that have serious interference.

Neighboring cell measurement subsets of micro cells except the neighboring micro cells that have serious interference may be the same or different, which is not limited in the present invention. In a possible implementation manner, for the micro cells except the neighboring micro cells that have serious interference, the base station may configure same neighboring cell measurement subsets for these micro cells.

Step 602: The base station determines N micro cells on which measurement of neighboring cell RRM needs to be performed by the UE, where N is a natural number.

Step 603: The base station obtains the neighboring cell measurement subset of each micro cell of the N micro cells, and determines at least one measurement subframe for each micro cell of the N micro cells from the obtained neighboring cell measurement subsets.

An $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N.

Step 604: The base station sends, to the UE, information about the at least one measurement subframe determined by the base station for each micro cell of the N micro cells.

The information about the at least one measurement subframe determined for the N micro cells may be carried in specific RRC signaling and sent to the UE.

Step 605: The UE receives the information that is about the at least one measurement subframe determined by the base station for each micro cell of the N micro cells and is sent by the base station, and measures neighboring cell RRM of a corresponding micro cell.

In the method for measuring neighboring cell RRM provided in this embodiment, impact of inter-micro-cell interference on measuring the neighboring cell RRM by UE can be reduced.

Corresponding to the embodiments of the method for measuring neighboring cell RRM in the present invention, the present invention further provides embodiments of an apparatus for measuring neighboring cell RRM.

Referring to FIG. 7, FIG. 7 is a block diagram of an embodiment of UE according to the present invention.

UE 700 includes: an obtaining unit 710, an access unit 720, and a measurement unit 730.

The obtaining unit 710 is configured to obtain, from a base station, first information and second information that are sent by the base station and about a micro base station, where the first information is used to indicate the micro base station, and the second information is used to indicate a random access resource allocated by the base station to the micro base station.

The access unit 720 is configured to access, by using the random access resource indicated by the second information, the micro base station indicated by the first information, and obtain measurement subframe information of a micro cell of the micro base station from the micro base station during a process of accessing the micro base station, where the measurement subframe information of the micro cell is different from measurement subframe information of another micro cell that is adjacent to the micro cell and whose interference exceeds a preset interference threshold.

The measurement unit 730 is configured to measure neighboring cell radio resource management of the micro cell on a measurement subframe indicated by the measurement subframe information.

Optionally, the access unit 720 may include a transceiver unit.

The transceiver unit is configured to send a random access request message to the micro base station during the process in which the user equipment accesses the micro base station, and add a preset preamble or measurement subframe obtaining indication information to the random access request message, where the preset preamble or the measurement subframe obtaining indication information is used to indicate obtaining the measurement subframe information of the micro cell of the micro base station.

The transceiver unit is further configured to receive, during the process in which the user equipment accesses the micro base station, a random access response message sent by the micro base station, and obtain the measurement subframe information of the micro cell of the micro base station from the random access response message.

Optionally, the obtaining unit 710 may be further configured to receive information that is about initial random access transmit power and sent by the base station.

Correspondingly, the transceiver unit may be specifically configured to send the random access request message by using the initial random access transmit power indicated by the information about the initial random access transmit power.

Optionally, the random access resource allocated by the base station to the micro cell may be predetermined by the base station by means of OAM, or may be determined after the base station negotiates with the micro base station in advance.

The UE provided in this embodiment accesses a micro base station by using a random access resource, obtains measurement subframe information of a micro cell of the micro base station from the micro base station during an access process, and measures neighboring cell RRM of the micro cell on a measurement subframe indicated by the measurement subframe information. Because the measurement subframe of the micro cell is different from a measurement subframe of another micro cell that is adjacent to the micro cell and causes serious interference, when the UE measures the neighboring cell RRM of the micro cell, relatively less interference is caused by the another micro cell to measuring the neighboring cell RRM of the micro cell by the UE, thereby reducing impact of inter-micro-cell interference on measuring the neighboring cell RRM by the UE.

Figure 8:
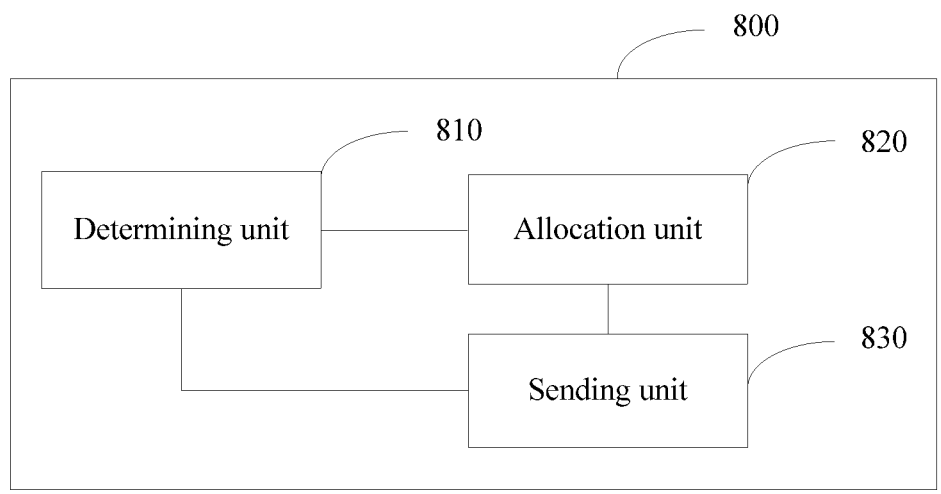
FIG. 8 is a structural diagram of an embodiment of a base station according to the present invention.

Referring to FIG. 8, FIG. 8 is a block diagram of an embodiment of a base station according to the present invention.

A base station 800 includes: a determining unit 810, an allocation unit 820, and a sending unit 830.

The determining unit 810 is configured to determine a micro base station in a micro cell on which measurement of neighboring cell RRM needs to be performed by UE.

The allocation unit 820 is configured to allocate a random access resource to the micro base station determined by the determining unit 810.

The sending unit 830 is configured to send information about the micro base station and information about the random access resource to the UE, so that the UE accesses the micro base station by using the random access resource, obtains measurement subframe information of the micro cell from the micro base station during an access process, and measures the neighboring cell RRM of the micro cell on a measurement subframe indicated by the measurement subframe information of the micro cell, where the measurement subframe information of the micro cell is different from measurement subframe information of another micro cell that is adjacent to the micro cell and whose interference exceeds a preset interference threshold.

Optionally, the determining unit 810 may be further configured to: determine initial random access transmit power at which the UE performs the access.

Correspondingly, the sending unit 820 may be further configured to send information about the initial random access transmit power to the UE when sending the information about the micro cell and the information about the random access resource to the UE.

Optionally, the determining unit 810 may be specifically configured to perform path loss estimation according to RSRP or RSRQ that is of the micro cell and is reported by the UE, and determine the initial random access transmit power according to an estimated value of the path loss estimation.

Optionally, the information about the initial random access transmit power is carried in a transmit power control command.

The base station provided in this embodiment determines a micro base station in a micro cell on which measurement of neighboring cell RRM needs to be performed by UE, allocates a random access resource to the micro base station, and sends information about the micro base station and information about the random access resource allocated to the micro base station to the UE, so as to assist the UE in implementing measurement of the neighboring cell RRM of the micro cell.

Figure 9:
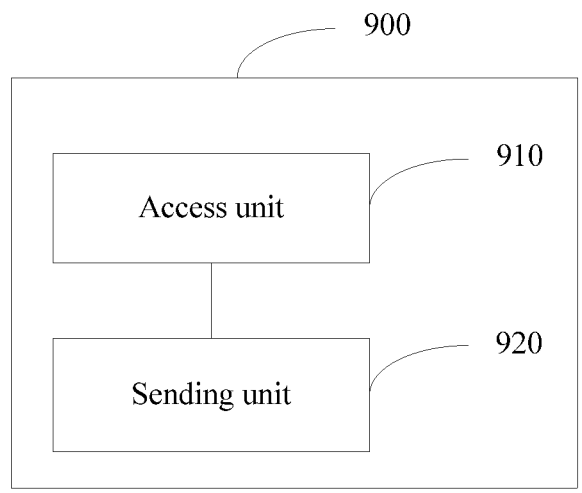
FIG. 9 is a structural diagram of an embodiment of a micro base station according to the present invention.

Referring to FIG. 9, FIG. 9 is a block diagram of an embodiment of a micro base station according to the present invention.

A micro base station 900 includes an access unit 910 and a sending unit 920.

The access unit 910 is configured to perform access processing with the UE by using a random access resource allocated by a base station to the UE.

The sending unit 920 is configured to send measurement subframe information of a micro cell of the micro base station to the UE during an access process of the access unit 910, so that the UE performs measurement of neighboring cell RRM on the micro cell on a measurement subframe of the micro cell, where the measurement subframe information of the micro cell is different from measurement subframe information of another micro cell that is adjacent to the micro cell and whose interference exceeds a preset interference threshold.

Optionally, the sending unit 920 may be specifically configured to send a random access response message to the UE during the access process according to a preset preamble or measurement subframe obtaining indication information carried in a random access request message sent by the UE, where the random access response message carries the measurement subframe information of the micro cell of the micro base station.

The micro base station provided in this embodiment performs access processing with UE, and sends measurement subframe information of a micro cell of the micro base station to the UE during an access process, so that the UE measures neighboring cell RRM of the micro cell on a measurement subframe of the micro cell, and the micro base station implements measurement of the neighboring cell RRM of the micro cell in collaboration with the UE.

Figure 10:
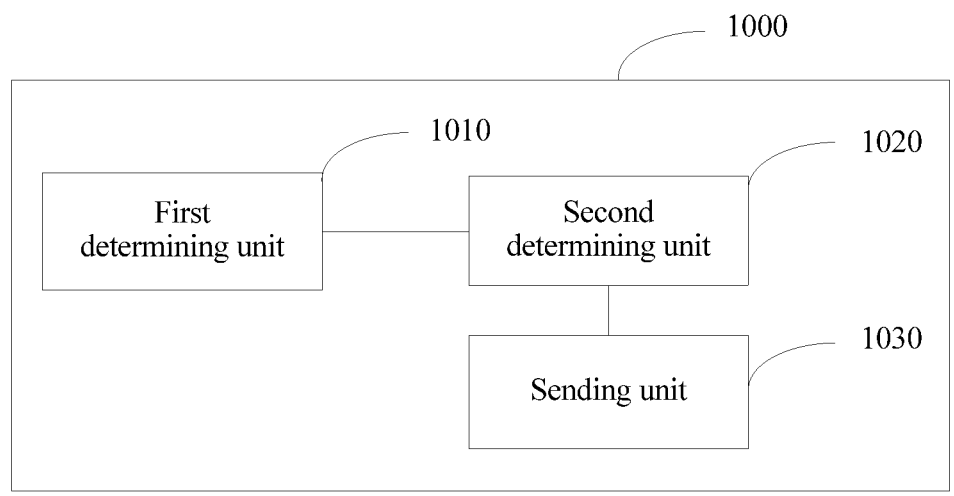
FIG. 10 is a structural diagram of another embodiment of a base station according to the present invention.

Referring to FIG. 10, FIG. 10 is a block diagram of an embodiment of a base station according to the present invention.

The apparatus 1000 includes: a first determining unit 1010, a second determining unit 1020, and a sending unit 1030.

The first determining unit 1010 is configured to determine N micro cells on which measurement of neighboring cell RRM needs to be performed by UE, where N is a natural number.

The second determining unit 1020 is configured to determine at least one measurement subframe for each micro cell in the N micro cells, where an $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N.

The sending unit 1030 is configured to send, to the UE, information about the at least one measurement subframe determined by the second determining unit 1020 for each micro cell of the N micro cells, so that the UE measures neighboring cell RRM.

Optionally, the information about the at least one measurement subframe determined by the second determining unit 1020 for the N micro cells is carried in a radio resource control command.

Optionally, different measurement subframes are determined by the base station for the two neighboring micro cells whose interference exceeds the preset interference threshold. For a measurement subframe of each micro cell, a micro base station in a micro cell that is adjacent to the micro cell and whose interference to the micro cell exceeds the preset interference threshold configures a corresponding measurement subframe as an ABS.

In the base station provided in this embodiment, impact of inter-micro-cell interference on measuring neighboring cell RRM by UE can be reduced.

Figure 11:
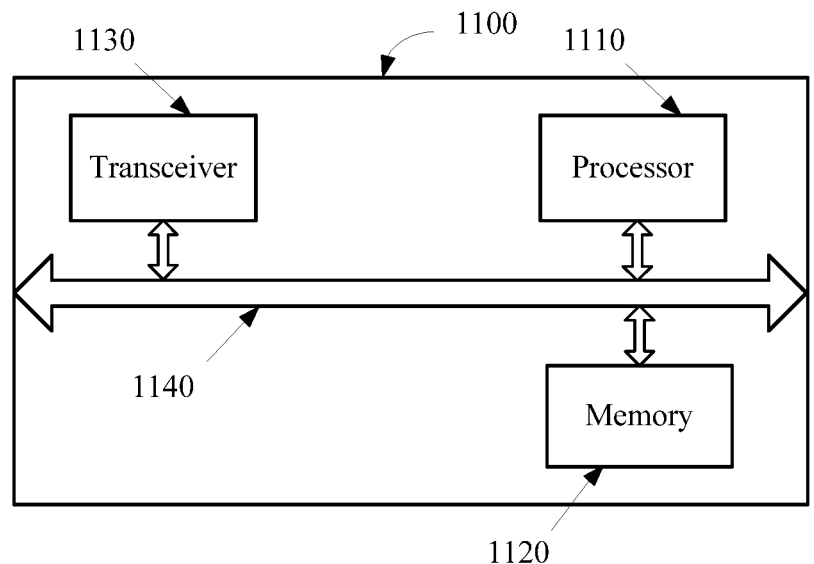
FIG. 11 is a structural diagram of another embodiment of user equipment according to the present invention.

Referring to FIG. 11, FIG. 11 is a schematic structural diagram of UE according to an embodiment of the present invention. The UE 1100 includes: a processor 1110, a memory 1120, a transceiver 1130, and a bus 1140.

The processor 1110, the memory 1120, and the transceiver 1130 are connected to each other by using the bus 1140, and the bus 1140 may be an ISA bus, a PCI bus, an EISA bus, or the like. The bus may be classified into an address bus, a data bus, a control bus, and the like. For ease of denotation, the bus is indicated by using only one thick line in FIG. 11. However, it does not indicate that there is only one bus or only one type of bus.

The memory 1120 is configured to store a program. Specifically, the program may include program code, and the program code includes a computer operation instruction. The memory 1120 may include a high-speed RAM memory, or may also include a non-volatile memory, for example, at least one magnetic disk storage.

The transceiver 1130 is configured to be connected to other devices and communicate with the other devices. The transceiver 1130 is configured to obtain, from a base station, first information and second information that are sent by the base station and about a micro base station, where the first information is used to indicate the micro base station, and the second information is used to indicate a random access resource allocated by the base station to the micro base station; access, by using the random access resource indicated by the second information, the micro base station indicated by the first information; and measure neighboring cell RRM of the micro cell on a measurement subframe indicated by measurement subframe information that is of the micro cell and obtained by the processor 1110.

The processor 1110 executes the program code and is configured to obtain the measurement subframe information of the micro cell of the micro base station from the micro base station during a process of accessing the micro base station, where the measurement subframe information of the micro cell is different from measurement subframe information of another micro cell that is adjacent to the micro cell and whose interference exceeds a preset interference threshold.

Optionally, the processor 1110 may be specifically configured to: send a random access request message to the micro base station during an access process, and add a preset preamble or measurement subframe obtaining indication information to the random access request message, where the preset preamble or the measurement subframe obtaining indication information is used to indicate obtaining the measurement subframe information of the micro cell of the micro base station; and receive a random access response message sent by the micro base station during the access process, and obtain measurement subframe information of the micro cell from the random access response message.

Optionally, the transceiver 1130 may be further configured to receive information that is about initial random access transmit power and sent by the base station.

Correspondingly, the transceiver 1130 may be further configured to: when using the random access resource indicated by the first information to access the micro base station indicated by the second information, send the random access request message by using the initial random access transmit power indicated by the information about the initial random access transmit power.

Optionally, the random access resource allocated by the base station to the micro cell may be predetermined by the base station by means of OAM, or may be determined after the base station negotiates with the micro base station in advance.

The UE provided in this embodiment accesses a micro base station by using a random access resource, obtains measurement subframe information of a micro cell of the micro base station from the micro base station during an access process, and measures neighboring cell RRM of the micro cell on a measurement subframe indicated by the measurement subframe information. Because the measurement subframe of the micro cell is different from a measurement subframe of another micro cell that is adjacent to the micro cell and causes serious interference, when the UE measures the neighboring cell RRM of the micro cell, relatively less interference is caused by the another micro cell to measuring the neighboring cell RRM of the micro cell by the UE, thereby reducing impact of inter-micro-cell interference on measuring the neighboring cell RRM by the UE.

Figure 12:
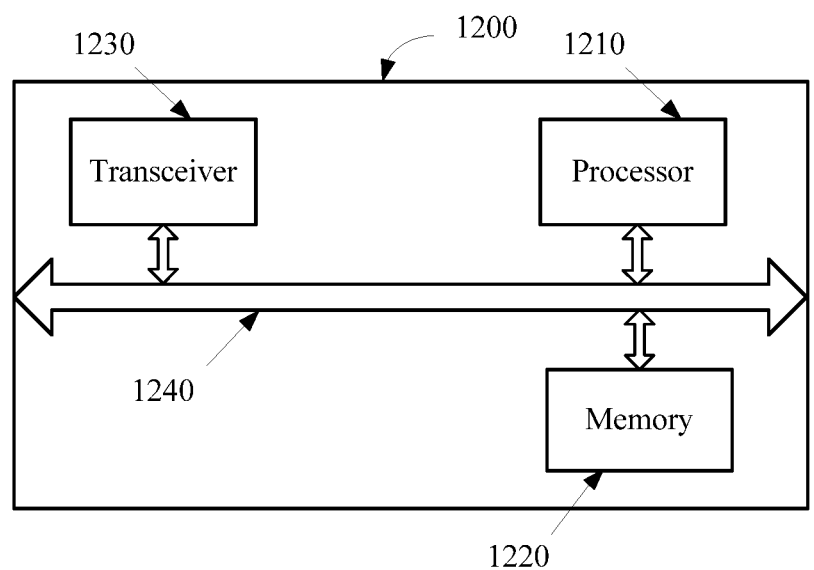
FIG. 12 is a structural diagram of another embodiment of a base station according to the present invention.

Referring to FIG. 12, FIG. 12 is a schematic structural diagram of a base station according to an embodiment of the present invention. The base station 1200 includes: a processor 1210, a memory 1220, a transceiver 1230, and a bus 1240.

The processor 1210, the memory 1220, and the transceiver 1230 are connected to each other by using the bus 1240, and the bus 1240 may be an ISA bus, a PCI bus, an EISA bus, or the like. The bus may be classified into an address bus, a data bus, a control bus, and the like. For ease of denotation, the bus is indicated by using only one thick line with arrows in FIG. 12. However, it does not indicate that there is only one bus or only one type of bus.

The memory 1220 is configured to store a program. Specifically, the program may include program code, and the program code includes a computer operation instruction. The memory 1220 may include a high-speed RAM memory, or may also include a non-volatile memory, for example, at least one magnetic disk storage.

The transceiver 1230 is configured to be connected to other devices and communicate with the other devices. The transceiver 1230 is configured to send information about a micro base station and information about a random access resource that are determined by the processor 1210 to the UE, so that the UE accesses the micro base station by using the random access resource, obtains measurement subframe information of the micro cell from the micro base station during an access process, and measures neighboring cell RRM of the micro cell on a measurement subframe indicated by the measurement subframe information of the micro cell.

The processor 1210 executes the program code, and is configured to determine a micro base station in a micro cell on which measurement of neighboring cell RRM needs to be performed by UE and allocate the random access resource to the micro base station.

The measurement subframe information of the micro cell is different from measurement subframe information of another micro cell that is adjacent to the micro cell and whose interference exceeds a preset interference threshold.

Optionally, the processor 1210 may be further configured to determine initial random access transmit power at which the UE performs the access.

Correspondingly, the transceiver 1230 may be further configured to send the initial random access transmit power to the UE when sending the information about the micro cell and the information about the random access resource to the UE.

Optionally, the processor 1210 may be specifically configured to perform path loss estimation according to RSRP or RSRQ that is of the micro cell and is reported by the UE, and determine the initial random access transmit power according to an estimated value of the path loss estimation.

Optionally, the transceiver 1230 may be further specifically configured to send the initial random access transmit power to the UE by using a TPC command carried on a PDCCH.

The base station provided in this embodiment determines a micro base station in a micro cell on which measurement of neighboring cell RRM needs to be performed by UE, allocates a random access resource to the micro base station, and sends information about the micro base station and information about the random access resource allocated to the micro base station to the UE, so as to assist the UE in implementing measurement of the neighboring cell RRM of the micro cell.

Figure 13:
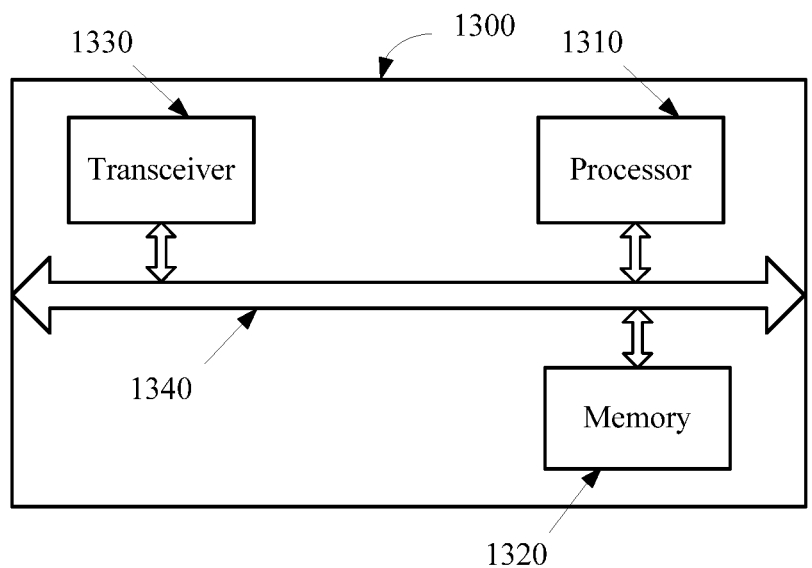
FIG. 13 is a structural diagram of another embodiment of a micro base station according to the present invention.

Referring to FIG. 13, FIG. 13 is a schematic structural diagram of a micro base station according to an embodiment of the present invention. The micro base station 1300 includes: a processor 1310, a memory 1320, a transceiver 1330, and a bus 1340.

The processor 1310, the memory 1320, and the transceiver 1330 are connected to each other by using the bus 1340, and the bus 1340 may be an ISA bus, a PCI bus, an EISA bus, or the like. The bus may be classified into an address bus, a data bus, a control bus, and the like. For ease of denotation, the bus is indicated by using only one thick line with arrows in FIG. 13; however, it does not indicate that there is only one bus or only one type of bus.

The memory 1320 is configured to store a program. Specifically, the program may include program code, and the program code includes a computer operation instruction. The memory 1320 may include a high-speed RAM memory, or may also include a non-volatile memory, for example, at least one magnetic disk storage.

The transceiver 1330 is configured to be connected to other devices and communicate with the other devices. The transceiver 1330 is configured to perform access processing with the UE by using a random access resource allocated by a base station to the UE, and send measurement subframe information of a micro cell of the micro base station to the UE during an access process, so that the UE measures neighboring cell RRM of the micro cell on a measurement subframe indicated by the measurement subframe information of the micro cell.

The measurement subframe information of the micro cell is different from measurement subframe information of another micro cell that is adjacent to the micro cell and whose interference exceeds a preset interference threshold.

The processor 1310 executes the program code.

Optionally, the transceiver 1330 may be specifically configured to send a random access response message to the UE when it is determined, during the access process according to a preset preamble or measurement subframe obtaining indication information carried in a random access request message sent by the user equipment, that a purpose of an access of the UE is to obtain RRM measurement subframe information, and the random access response message carries the measurement subframe information of the micro cell of the micro base station.

The micro base station provided in this embodiment performs access processing with UE, and sends measurement subframe information of a micro cell of the micro base station to the UE during an access process, so that the UE measures neighboring cell RRM of the micro cell on a measurement subframe of the micro cell, and the micro base station implements measurement of the neighboring cell RRM of the micro cell in collaboration with the UE.

Figure 14:
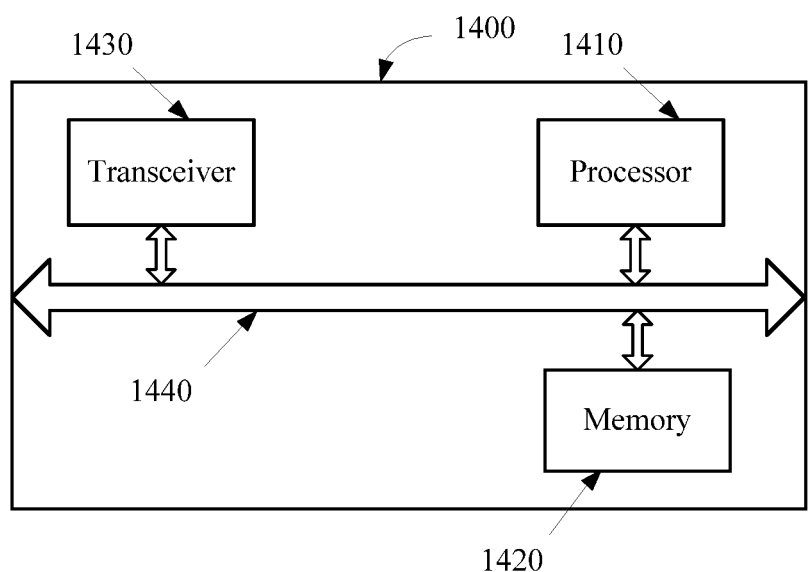
FIG. 14 is a structural diagram of another embodiment of a base station according to the present invention.

Referring to FIG. 14, FIG. 14 is a schematic structural diagram of a base station according to an embodiment of the present invention. The base station 1400 includes: a processor 1410, a memory 1420, a transceiver 1430, and a bus 1440.

The processor 1410, the memory 1420, and the transceiver 1430 are connected to each other by using the bus 1440, and the bus 1440 may be an ISA bus, a PCI bus, an EISA bus, or the like. The bus may be classified into an address bus, a data bus, a control bus, and the like. For ease of denotation, the bus is indicated by using only one thick line with arrows in FIG. 14. However, it does not indicate that there is only one bus or only one type of bus.

The memory 1420 is configured to store a program. Specifically, the program may include program code, and the program code includes a computer operation instruction. The memory 1420 may include a high-speed RAM memory, or may also include a non-volatile memory, for example, at least one magnetic disk storage.

The transceiver 1430 is configured to be connected to other devices and communicate with the other devices. The transceiver 1430 is configured to send, to UE, information about at least one measurement subframe determined by the processor 1410 for N micro cells, so that the UE measures neighboring cell RRM.

The processor 1410 executes the program code and is configured to determine the N micro cells on which measurement of neighboring cell RRM needs to be performed by the UE, where N is a natural number; and determine at least one measurement subframe for each micro cell in the N micro cells, where an $i^{th}$ measurement subframe is different from a $j^{th}$ measurement subframe, the $i^{th}$ measurement subframe is allocated by the base station to an $i^{th}$ micro cell, the $j^{th}$ measurement subframe is allocated by the base station to a $j^{th}$ micro cell, the $i^{th}$ micro cell is adjacent to the $j^{th}$ micro cell, interference exceeds a preset interference threshold, the $i^{th}$ micro cell and the $j^{th}$ micro cell are two of the N micro cells, i is an integer that is greater than 0 and not greater than N, and j is an integer that is greater than 0 and not greater than N.

Optionally, the transceiver 1430 may be specifically configured to send, to the UE by using RRC signaling, the information about the at least one measurement subframe determined by the processor 1410 for each micro cell of the N micro cells.

The base station provided in this embodiment determines micro cells on which measurement of neighboring cell RRM needs to be performed by UE, determines at least one measurement subframe for each micro cell, and sends the at least one measurement subframe determined for each micro cell to the UE, so that the UE measures the neighboring cell RRM of the micro cell on the at least one measurement subframe of each micro cell. Because measurement subframes for neighboring micro cells that have serious interference are different, when the neighboring cell RRM of the micro cell is measured, relatively less interference is caused by the another micro cell to measuring the neighboring cell RRM of the micro cell by the UE, thereby reducing impact of inter-micro-cell interference on measuring the neighboring cell RRM by the UE.

A person skilled in the art may clearly understand that the present invention may be implemented by using software in addition to a necessary universal hardware platform. Based on such an understanding, the technical solutions of the present invention essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, or a network device) to perform the methods described in the embodiments or some pails of the embodiments of the present invention.

In this specification, the embodiments are described in a progressive manner. Reference may be made to each other for a same or similar part of the embodiments. Each embodiment focuses on a difference from other embodiments. Especially, the system embodiment is basically similar to the method embodiments, and therefore is briefly described. For a relevant part, reference may be made to the description in the part of the method embodiments.

The foregoing descriptions are implementation manners of the present invention, but are not intended to limit the protection scope of the present invention. Any modification, equivalent replacement, or improvement made without departing from the spirit and principle of the present invention shall fall within the protection scope of the present invention.

What is claimed is:

1. A method, comprising:

obtaining, by user equipment from a base station, first information and second information that are sent by the base station, wherein the first information indicates a micro base station for which neighboring cell radio resource management measurement is to be performed by the user equipment, and the second information indicates a random access resource allocated by the base station to the micro base station;

requesting, by the user equipment from the micro base station in response to obtaining the first information and the second information, measurement subframe information of a micro cell of the micro base station to perform the neighboring cell radio resource management measurement according to the measurement subframe information, the measurement subframe information being requested during a process of accessing the micro base station using the random access resource; and performing, by the user equipment, the neighboring cell radio resource management measurement of the micro cell on a measurement subframe indicated by the measurement subframe information of the micro cell that is received from the micro base station; and wherein requesting the measurement subframe information of the micro cell of the micro base station comprises:

sending, by the user equipment, a random access request message to the micro base station during the process of accessing the micro base station, and adding a preset preamble or measurement subframe obtaining indication information to the random access request message, wherein the preset preamble or the measurement subframe obtaining indication information indicates obtaining the measurement subframe information of the micro cell of the micro base station; and receiving, by the user equipment during the process of accessing the micro base station, a random access response message sent by the micro base station, and obtaining the measurement subframe information of the micro cell of the micro base station from the random access response message.

2. The method according to claim 1, wherein before requesting the measurement subframe information of the micro cell of the micro base station, the method further comprises:

receiving, by the user equipment, information that is about initial random access transmit power and sent by the base station; and sending, by the user equipment when using the random access resource indicated by the first information to access the micro base station indicated by the second information, the random access request message using the initial random access transmit power indicated by the information about the initial random access transmit power.

3. The method according to claim 1, wherein the preset preamble is stored in advance in the user equipment or is indicated to the user equipment by the base station using explicit signaling.

4. The method according to claim 1, wherein the random access resource allocated by the base station to the micro base station is predetermined by the base station by means of operation, administration, and maintenance; or wherein the random access resource allocated by the base station to the micro base station is determined after the base station negotiates with the micro base station in advance.

5. A method, comprising:

determining, by a base station, a micro base station from a plurality of micro base stations for which measurement of neighboring cell radio resource management needs to be performed by user equipment, the plurality of micro base stations having preconfigured measurement subframe information different than each other;

allocating, by the base station to the micro base station, a random access resource for the user equipment to use to obtain measurement subframe information of a micro cell of the micro base station from the micro base station; and sending, by the base station, information about the micro base station and the random access resource to the user equipment, sending the information instructing the user equipment to request the measurement subframe information of the micro cell from the micro base station by accessing the micro base station using the random access resource, and perform the neighboring cell radio resource management measurement of the micro cell according to the measurement subframe information of the micro cell; and wherein the user equipment obtains the measurement subframe information of the micro cell of the micro base station by:

sending a random access request message to the micro base station during a process of accessing the micro base station, and adding a preset preamble or measurement subframe obtaining indication information to the random access request message, wherein the preset preamble or the measurement subframe obtaining indication information indicates obtaining the measurement subframe information of the micro cell of the micro base station; and receiving, during the process of accessing the micro base station, a random access response message sent by the micro base station, and obtaining the measurement subframe information of the micro cell of the micro base station from the random access response message.

6. The method according to claim 5, wherein before sending, by the base station, the information about the micro cell and the random access resource to the user equipment, the method further comprises:

determining, by the base station, initial random access transmit power at which the user equipment accesses the micro base station; and sending, by the base station when sending the information about the micro cell and the random access resource to the user equipment, information about the initial random access transmit power to the user equipment.

7. A method, comprising:

performing, by a micro base station, an access process with user equipment using a random access resource allocated by a base station to the user equipment;

receiving, by the micro base station from the user equipment during the access process, a message requesting measurement subframe information of a micro cell of the micro base station for the user equipment to perform neighboring cell radio resource management measurement of the micro cell according to the measurement subframe information of the micro cell; and sending, by the micro base station to the user equipment during the access process, the measurement subframe information of the micro cell in a random access response message in response to receipt of the message; and wherein the message is a random access request message comprising a preset preamble or measurement subframe obtaining indication information, and the preset preamble or the measurement subframe obtaining indication information indicates obtaining the measurement subframe information of the micro cell of the micro base station.

8. The method according to claim 7, wherein sending the measurement subframe information comprises:

sending, by the micro base station, the random access response message to the user equipment during the access process according to the preset preamble or measurement subframe obtaining indication information carried in the random access request message sent by the user equipment, wherein the random access response message carries the measurement subframe information of the micro cell of the micro base station.

9. User equipment, comprising:

a processor;

a memory; and a communications bus;

wherein the communications bus is configured for connection and communication among the processor and the memory;

wherein the memory includes computer program code, and the memory and the computer program code are configured, with the processor, to cause the user equipment to:

obtain first information and second information that are sent by a base station, wherein the first information indicates a micro base station for which neighboring cell radio resource management measurement is to be performed by the user equipment, and the second information indicates a random access resource allocated by the base station to the micro base station;

access, using the random access resource indicated by the second information, the micro base station indicated by the first information, and request, in response to obtaining the first information and the second information, measurement subframe information of a micro cell of the micro base station from the micro base station to perform the neighboring cell radio resource management measurement according to the measurement subframe information, the measurement subframe information being requested during a process of accessing the micro base station; and perform the neighboring cell radio resource management measurement of the micro cell on a measurement subframe indicated by the measurement subframe information of the micro cell that is received from the micro base station; and wherein requesting the measurement subframe information of the micro cell of the micro base station comprises:

sending a random access request message to the micro base station during the process of accessing the micro base station, and adding a preset preamble or measurement subframe obtaining indication information to the random access request message, wherein the preset preamble or the measurement subframe obtaining indication information indicates obtaining the measurement subframe information of the micro cell of the micro base station; and receiving, during the process of accessing the micro base station, a random access response message sent by the micro base station, and obtaining the measurement subframe information of the micro cell of the micro base station from the random access response message.

10. The user equipment according to claim 9, wherein the memory and the computer program code are further configured, with the processor, to cause the user equipment to:

receive information that is about initial random access transmit power and sent by the base station; and send, when using the random access resource indicated by the first information to access the micro base station indicated by the second information, the random access request message by using the initial random access transmit power indicated by the information about the initial random access transmit power.

11. A base station, comprising:
a processor;
a memory; and
a communications bus;
wherein the communications bus is configured for connection and communication among the processor and the memory;
wherein the memory includes computer program code, where the memory and the computer program code are configured, with the processor, to cause the base station to:

determine a micro base station from a plurality of micro base stations for which measurement of neighboring cell radio resource management needs to be performed by user equipment, the plurality of micro base stations having preconfigured measurement subframe information different than each other;

allocate a random access resource to the micro base station for the user equipment to use to obtain measurement subframe information of a micro cell of the micro base station from the micro base station; and send information about the micro base station and the random access resource to the user equipment, sending the information instructing the user equipment to request the measurement subframe information of the micro cell from the micro base station by accessing the micro base station using the random access resource, and perform the neighboring cell radio resource management measurement of the micro cell according to the measurement subframe information of the micro cell; and wherein the user equipment requests the measurement subframe information of the micro cell of the micro base station by:

sending a random access request message to the micro base station during a process of accessing the micro base station, and adding a preset preamble or measurement subframe obtaining indication information to the random access request message, wherein the preset preamble or the measurement subframe obtaining indication information indicates obtaining the measurement subframe information of the micro cell of the micro base station; and receiving, during the process of accessing the micro base station, a random access response message sent by the micro base station, and obtaining the measurement subframe information of the micro cell of the micro base station from the random access response message.

12. A micro base station, comprising:
a processor;
a memory; and
a communications bus;
wherein the communications bus is configured for connection and communication among the processor and the memory; and
wherein the memory includes computer program code, where the memory and the computer program code are configured, with the processor, to cause the micro base station to:

perform an access process with user equipment using a random access resource allocated by a base station to the user equipment;

receive, from the user equipment during the access process, a message requesting measurement subframe information of a micro cell of the micro base station for the user equipment to perform neighboring cell radio resource management measurement of the micro cell according to the measurement subframe information of the micro cell; and send, to the user equipment during the access process, the measurement subframe information of the micro cell in a random access response message in response to receipt of the message; and wherein the message is a random access request message comprising a preset preamble or measurement subframe obtaining indication information, and the preset preamble or the measurement subframe obtaining indication information indicates obtaining the measurement subframe information of the micro cell of the micro base station.

13. The micro base station according to claim 12, wherein the memory and the computer program code are configured, with the processor, to cause the micro base station to:

send the random access response message to the user equipment during the access process according to the preset preamble or measurement subframe obtaining indication information carried in the random access request message sent by the user equipment, wherein the random access response message carries the measurement subframe information of the micro cell of the micro base station.

* * * * *